(12) United States Patent
Gerhardt et al.

(10) Patent No.: US 8,855,895 B2
(45) Date of Patent: Oct. 7, 2014

(54) SYSTEM AND METHOD FOR REDUCING VEHICLE GENERATED CARBON DIOXIDE EMISSIONS

(71) Applicant: Ford Global Technologies, LLC, Dearborn, MI (US)

(72) Inventors: Torsten Gerhardt, London (GB); Marcus Hurst, London (GB); Robert Spahl, Cologne (DE); David Burrage, Horsham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/857,911

(22) Filed: Apr. 5, 2013

(65) Prior Publication Data

US 2013/0274951 A1    Oct. 17, 2013

(30) Foreign Application Priority Data

Apr. 17, 2012 (GB) .................. 1206692.4

(51) Int. Cl.
*G01C 21/34* (2006.01)
*G07C 5/08* (2006.01)
*B62D 47/00* (2006.01)
*B60W 20/00* (2006.01)
*B60P 3/06* (2006.01)
*F02D 41/04* (2006.01)
*G07C 5/00* (2006.01)

(52) U.S. Cl.
CPC .......... *G01C 21/3469* (2013.01); *B62D 47/006* (2013.01); *F02D 41/042* (2013.01); *G07C 5/085* (2013.01); *G07C 5/008* (2013.01); *B60Y 2200/112* (2013.01); *B60P 3/06* (2013.01); *B60W 20/00* (2013.01)
USPC ....... 701/112; 296/158; 701/123; 340/426.11

(58) Field of Classification Search
None
See application file for complete search history.

(56) References Cited

U.S. PATENT DOCUMENTS

| | | | |
|---|---|---|---|
| 6,037,746 A | 3/2000 | Sheng et al. | |
| 6,564,127 B1 * | 5/2003 | Bauerle et al. | 701/34.3 |

(Continued)

FOREIGN PATENT DOCUMENTS

| | | | |
|---|---|---|---|
| CN | 101042780 A | * | 9/2007 |
| DE | 102005036590 A1 | * | 3/2006 |

(Continued)

OTHER PUBLICATIONS

Planet Bike, "Protegé9.0", [no publication date specified], Planet Bike, http://ecom1.planetbike.com/8002.html, Archived by archive.org on Feb. 11, 2010.*

(Continued)

*Primary Examiner* — John R Olszewski
*Assistant Examiner* — Jeffrey Boomer
(74) *Attorney, Agent, or Firm* — Julia Voutyras; Alleman Hall McCoy Russell & Tuttle LLP

(57) ABSTRACT

A system is disclosed having a primary vehicle and a secondary vehicle that is carried by the primary vehicle when not in use. The system further includes at least one of an immobilizing device to immobilize the primary vehicle if the secondary vehicle is removed from the primary vehicle, a data storage device for storing information regarding usage of the primary and secondary vehicles, a user interface device for displaying information regarding usage of the primary and secondary vehicles, and a user prompt for providing information regarding potential opportunities for use of the secondary vehicle to encourage usage of the secondary vehicle and lower CO2 emissions.

20 Claims, 7 Drawing Sheets

(56) References Cited

U.S. PATENT DOCUMENTS

2007/0241869 A1* 10/2007 Kalous ........................ 340/431
2009/0271109 A1* 10/2009 Lee et al. ..................... 701/208
2011/0079166 A1    4/2011 Popa-Simil

FOREIGN PATENT DOCUMENTS

| DE | 102010042018 A1 | 4/2012 | |
| DE | 102011087959 A1 | 6/2013 | |
| EP | 0300340 A1 * | 1/1989 | ............ A61G 5/00 |
| EP | 1760486 A2 * | 3/2007 | |
| KR | 20120002255 A | 1/2012 | |
| WO | 2008054719 A2 | 5/2008 | |
| WO | WO 2011029750 A1 * | 3/2011 | |

OTHER PUBLICATIONS

Volkner Mobil. http://www.volkner-mobil.de/info/1_english/info_en.html. Archived by Archive.org Apr. 3, 2010.*

Volkner Mobil Brain Pilot. http://www.volkner-mobil.de/Reisemo/R_english/Brain_en.html Archived by Archive.org Oct. 17, 2011.*

* cited by examiner

SYSTEM AND METHOD FOR REDUCING VEHICLE GENERATED CARBON DIOXIDE EMISSIONS

CROSS REFERENCE TO RELATED APPLICATIONS

The present application claims priority to United Kingdom Patent Application No. 1206692.4, filed on Apr. 17, 2012, the entire contents of which are hereby incorporated by reference for all purposes.

INTRODUCTION AND SUMMARY

This invention relates to vehicle system including a composite passenger vehicle offering the potential for reduced Carbon Dioxide ($CO_2$) emissions.

Emissions from passenger vehicles and in particular $CO_2$ emissions is an ever increasing problem as is vehicle congestion in cities and large conurbations. In many parts of the world governments have implemented legislation to reduce the emission of Carbon dioxide from passenger vehicles by introducing so called 'carbon taxes' or 'green taxes' either directly on the manufacturers of the vehicle or by taxing users based upon the $CO_2$ their vehicle produces. Furthermore, in some countries, congestion charging is being introduced to discourage the use of passenger vehicles in major cities.

Consequently, much policy discussion and research focuses on what is often referred to as "the last mile problem" namely, if citizens are discouraged from using private vehicles in inner cities, how do they get from the last out-of-centre car park or the last public transport node (e.g. tram station or bus stop) to their final destination.

Some government bodies are regulating fleet-average emissions for car manufacturers by defining increasingly strict mandatory average emission targets, as well as eco-innovation credits and excess emission penalties.

Composite vehicles have a primary vehicle that produces $CO_2$ and a secondary vehicle that can be transported by the primary vehicle but which when used produces substantially less $CO_2$. An example of such a composite vehicle is a passenger vehicle having a cycle rack used to transport a pedal cycle. If the cycle is transported by the passenger vehicle and is used whenever it is practical to do so, then a significant reduction in $CO_2$ emissions and reduced congestion is potentially available. However there is currently no mechanism or user guidance available to encourage the most efficient possible usage of the two vehicles.

The inventors recognized a need for a composite vehicle that can assist with the aim of reducing $CO_2$ emissions and city congestion and a method to encourage more intelligent vehicle usage.

An embodiment disclosed herein provides a system and method for reducing road vehicle generated $CO_2$ emissions thereby potentially reducing costs to individual owner and/or users, vehicle manufacturers and the environment, as well as addressing the last-mile problem. Further, by communicatively coupling the primary vehicle to the secondary vehicle, the use of the secondary vehicle may be optimized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

DETAILED DESCRIPTION

Figure 1:
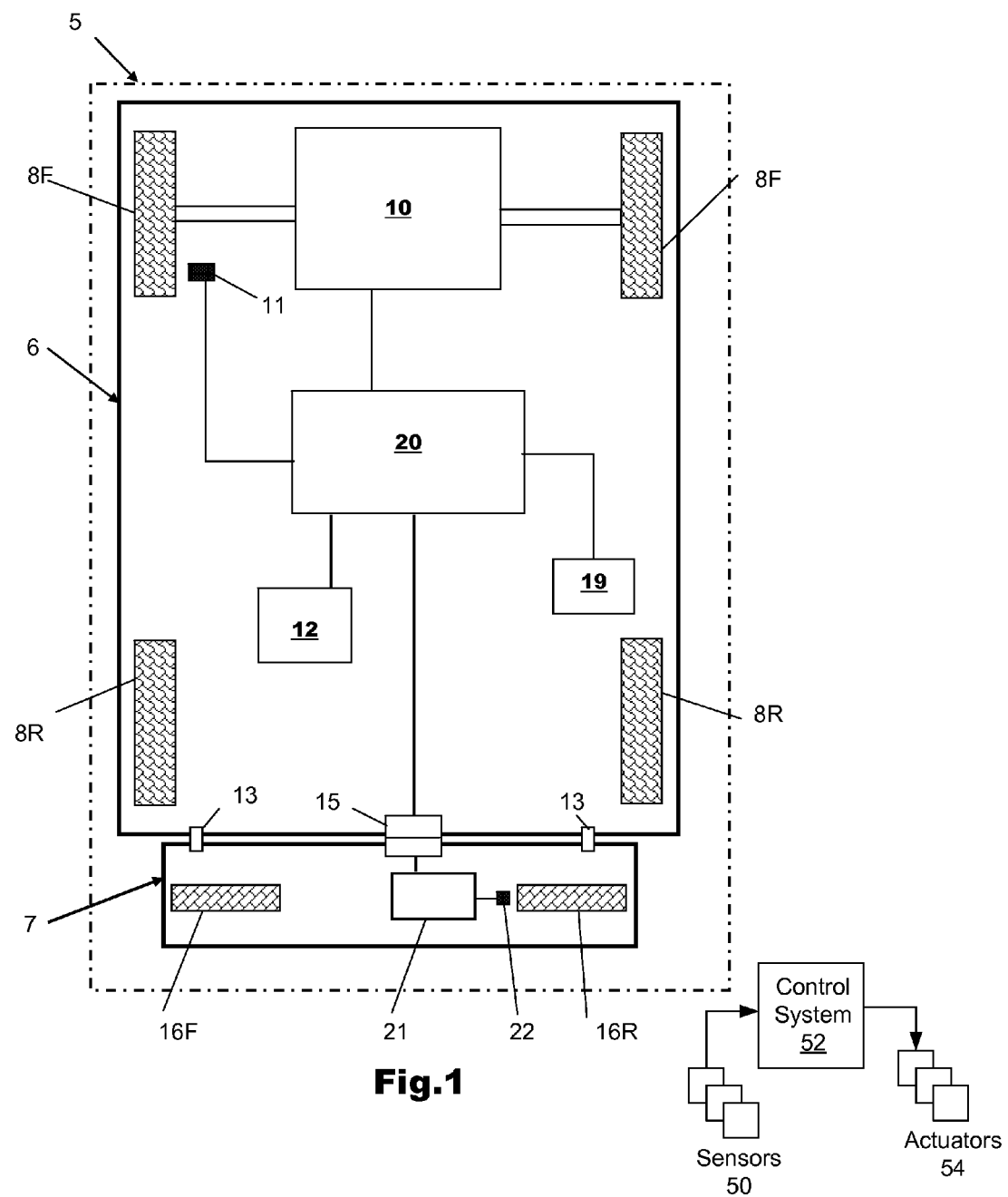
FIG. 1 is a block diagram of a first embodiment of a system including a composite vehicle according to a first embodiment.

A first embodiment provides a system for reducing vehicle generated carbon dioxide emissions, the system comprising a composite vehicle comprised of a primary vehicle having a carbon dioxide emission producing engine and a secondary vehicle producing less carbon dioxide emissions than the primary vehicle and being transportable by the primary vehicle. The secondary vehicle producing less carbon dioxide emissions may be a vehicle with a smaller engine, a plug-in electric vehicle, a hybrid battery-motor-engine powered vehicle, or a vehicle that, when traveling over a given distance carrying a passenger, produces at least some, but less, emissions over that distance than the primary vehicle would produce carrying the passenger of said distance.

The primary and/or secondary vehicle may include a diesel or petrol combustion engine. A composite vehicle may include a device to detect whether the secondary vehicle has been removed from the primary vehicle, an immobilizing device to immobilize the primary vehicle if the secondary vehicle is removed from the primary vehicle, a data storage device for storing information regarding usage of the primary and secondary vehicles, a user interface device for displaying information regarding usage of the primary and secondary vehicles, a user prompt device for providing information regarding potential opportunities for use of the secondary vehicle, and a device for transferring data regarding usage of the two vehicles to a third party.

The data storage device may comprise at least one memory unit for storing data regarding usage of the primary and secondary vehicles. One or more memory units may be arranged to store the distances travelled by the primary vehicle, time stamps of movement of the primary vehicle, time stamps of engine-on events of the primary vehicle, the energy consumed by the primary vehicle, the carbon dioxide produced by use of the primary vehicle, the distance travelled by the secondary vehicle, time stamps of movement of the secondary vehicle, time stamps of engine-on events of the secondary vehicle, the energy consumed by the secondary vehicle, the Carbon dioxide produced by use of the secondary vehicle, or some combination thereof.

The user interface device may display information regarding usage of the primary and secondary vehicles and may comprise a display showing the distance travelled by the primary vehicle and the distance travelled by the secondary vehicle. One or more displays may provide an indication of the actual usage of the primary vehicle compared to a target usage and/or a compensated usage for the primary vehicle based upon actual usage of the primary and secondary vehicles.

The system may include the immobilizing device to immobilize the primary vehicle and a device to detect whether the secondary vehicle has been removed from the primary vehicle.

The device to detect whether the secondary vehicle has been removed from the primary vehicle may comprise a physical sensor and a contactless communication link between the primary and secondary vehicles operable to determine when the secondary vehicle is located remotely from the primary vehicle. It may further include an electronic system for tracking the geographic positions of the primary and secondary vehicles that may be communicatively coupled to a control system. The control system may also compare the locations of the primary and secondary vehicles and provide an output indicative of the removal of the secondary vehicle if the respective geographic locations of the primary and secondary vehicles differ by more than a predefined amount.

The contactless communications link may utilize Radio Frequency Identification or Near Field Communication. It may further include an active radio frequency and a passive radio frequency tag on each vehicle and a radio frequency reader to read the output from the radio frequency tags.

The system may also include a data storage device for storing information regarding usage of the primary and secondary vehicles that may be displayed via a user interface device. The system may further include a user prompt device for displaying information regarding potential opportunities for use of the secondary vehicle.

Embodiments may utilize a navigation system capable of determining a current position of the motor vehicle and a destination for the primary vehicle based upon a user input. A user prompt may include a display that may indicate to a user of the primary vehicle when an opportunity for secondary vehicle use exists based upon information regarding the destination of the primary vehicle, the proximity of the primary vehicle to its destination, and/or the location of parking garages in the vicinity of the destination.

A control system may have instructions to determine and indicate an opportunity for use of the secondary vehicle in response to a determined cost, a travel time, an environmental advantage, or some combination thereof.

A navigation systems and/or the user prompt device of the primary vehicle may be removable from the primary vehicle for use on the secondary vehicle to enable the secondary vehicle to continue the journey to the destination and to guide the secondary vehicle back to the primary vehicle.

The destination information may be transferable to the secondary vehicle from the primary vehicle to enable the secondary vehicle to continue the journey to the destination and to guide the secondary vehicle back to the primary vehicle.

The data storage device for storing information regarding usage of the primary and secondary vehicles, the user interface for displaying information regarding usage of the primary and secondary vehicles, and/or the user prompt device for providing information regarding potential opportunities for use of the secondary vehicle may include or be included in a transportable communications device. A radio frequency reader may be included in the transportable communications device and may be operatively connected to the transportable communications device. The usage information may be transferred wirelessly or by a physical link.

Use of the secondary vehicle may produce significantly less or zero $CO_2$ emissions than the primary vehicle.

A further disclosed embodiment includes a method of operating a composite motor vehicle having a $CO_2$-emission-producing primary vehicle and a secondary vehicle. The secondary vehicle may produce significantly less $CO_2$ emissions than the primary vehicle for the same journey. The method may comprise allowing normal operation of the primary vehicle while the secondary vehicle is attached to the primary vehicle and immobilizing the primary vehicle if the secondary vehicle is removed from the primary vehicle.

Figure 2:
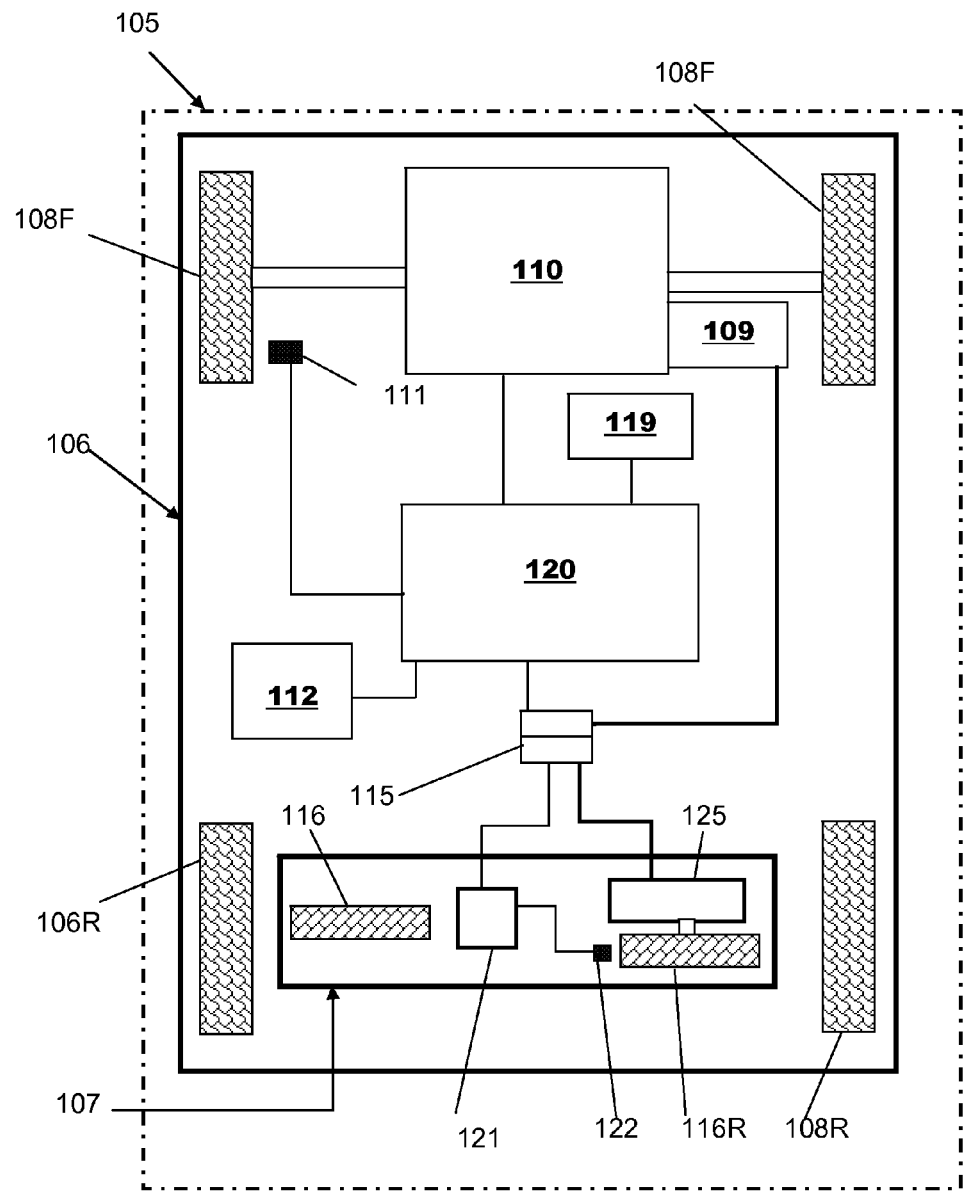
FIG. 2 is a block diagram of a second embodiment of a system including a composite vehicle according to an alternate embodiment.
Figure 2:
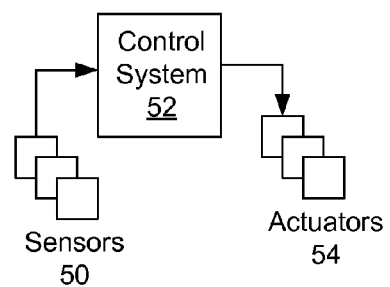
Figure 3:
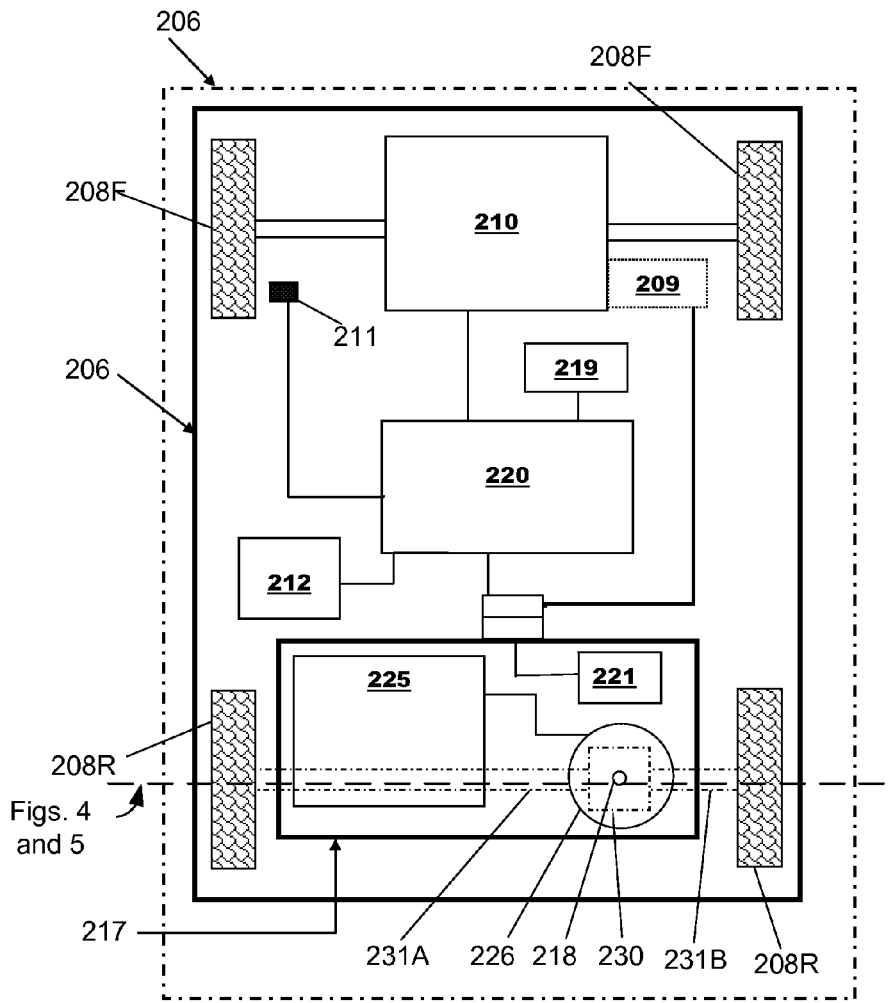
FIG. 3 is a block diagram of a third embodiment of a system including a composite vehicle according to an alternate embodiment.
Figure 3:
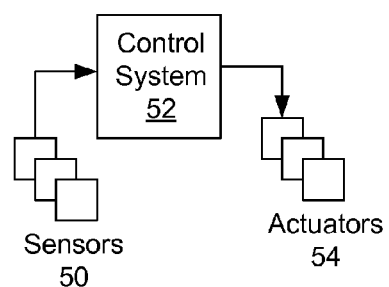
Figure 4:
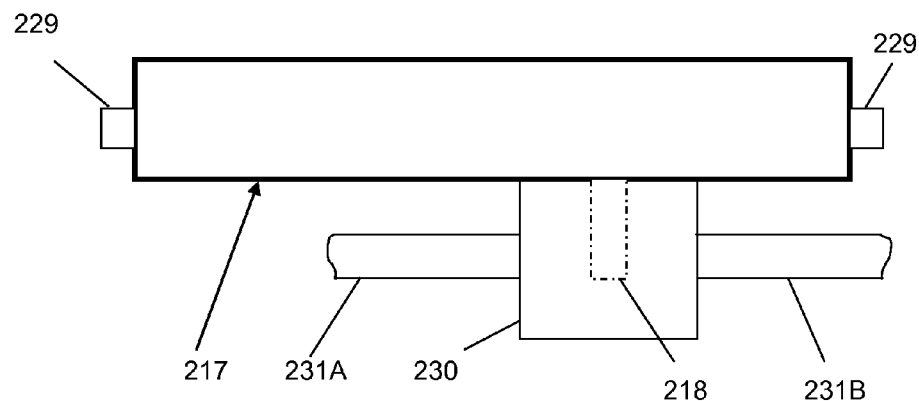
FIG. 4 is a side view of a combined battery and motor unit of the composite vehicle shown in FIG. 3.
Figure 5:
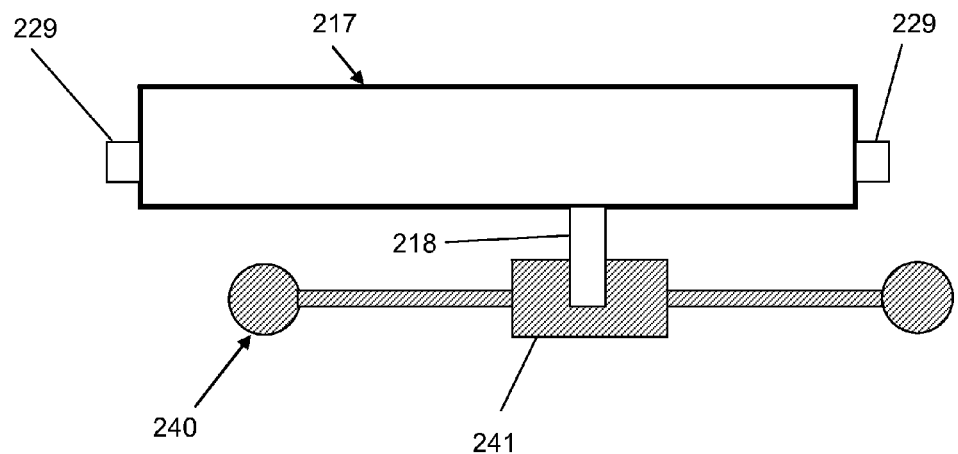
FIG. 5 is a view similar to that of FIG. 4 but showing the combined battery and motor unit connected to a road wheel.
Figure 6:
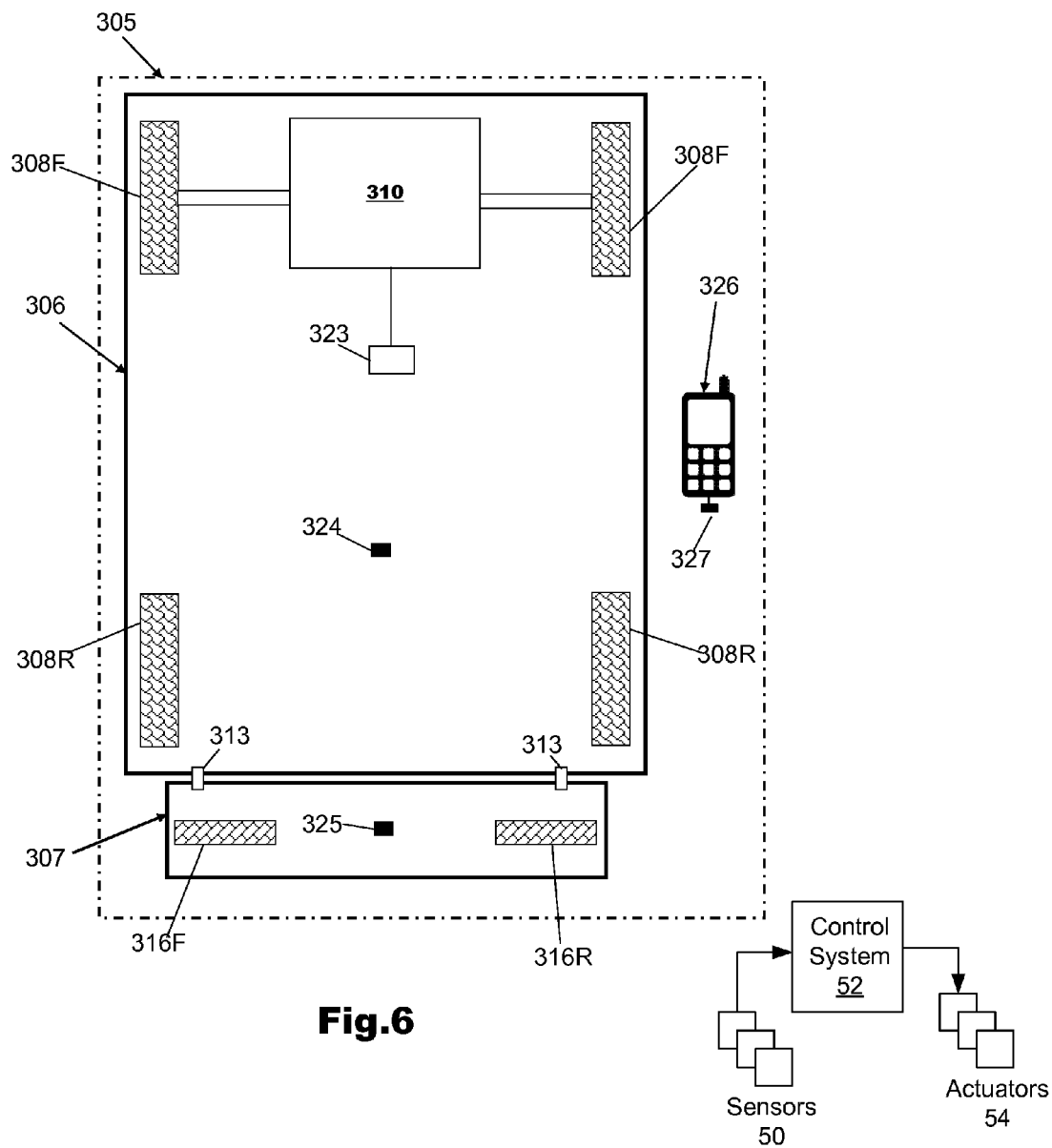
FIG. 6 is a block diagram of a fourth embodiment of a system including a composite vehicle an alternate embodiment.
Figure 7:
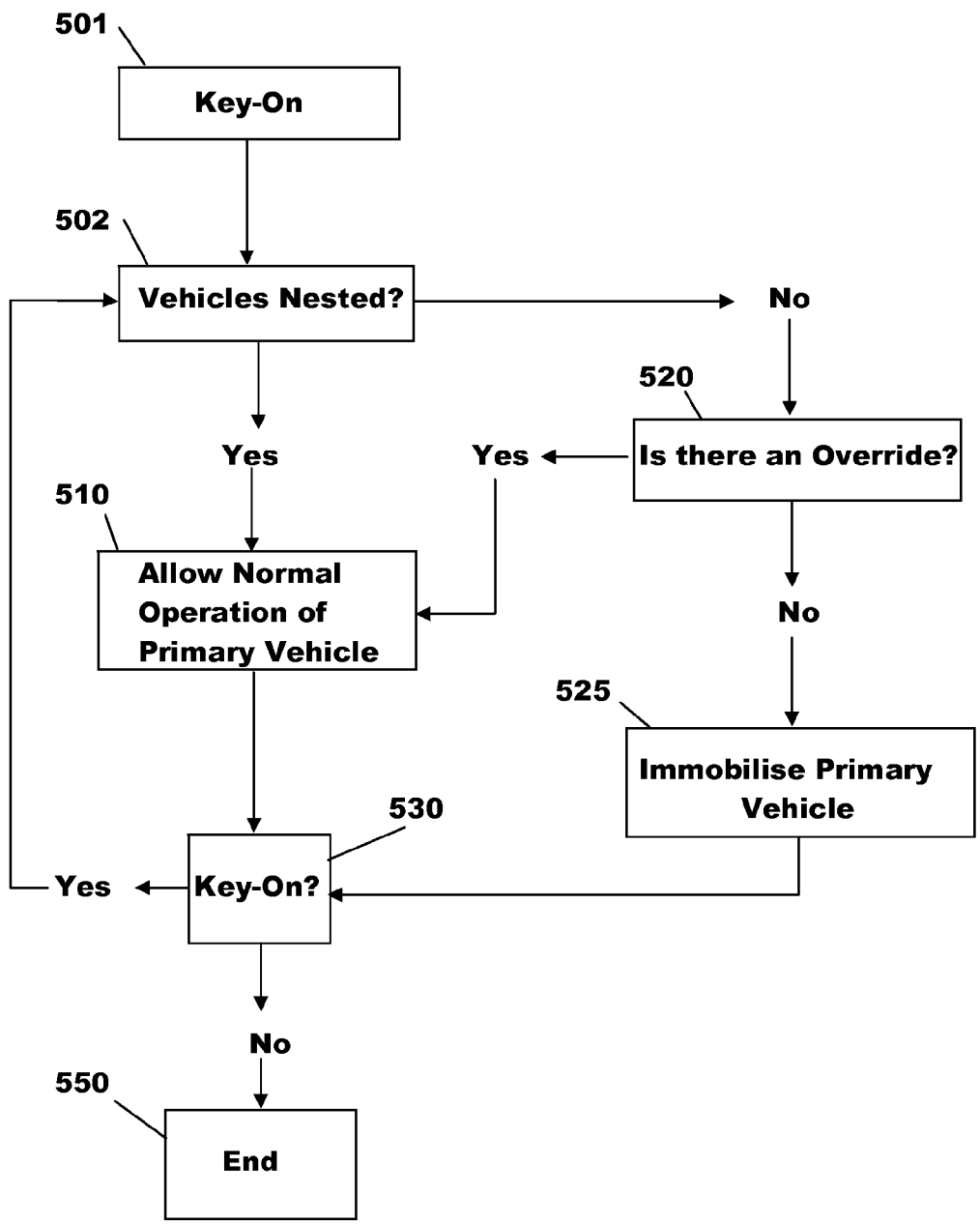
FIG. 7 is a flow chart of a method for operating a composite motor vehicle according to an alternate embodiment.
Figure 8:
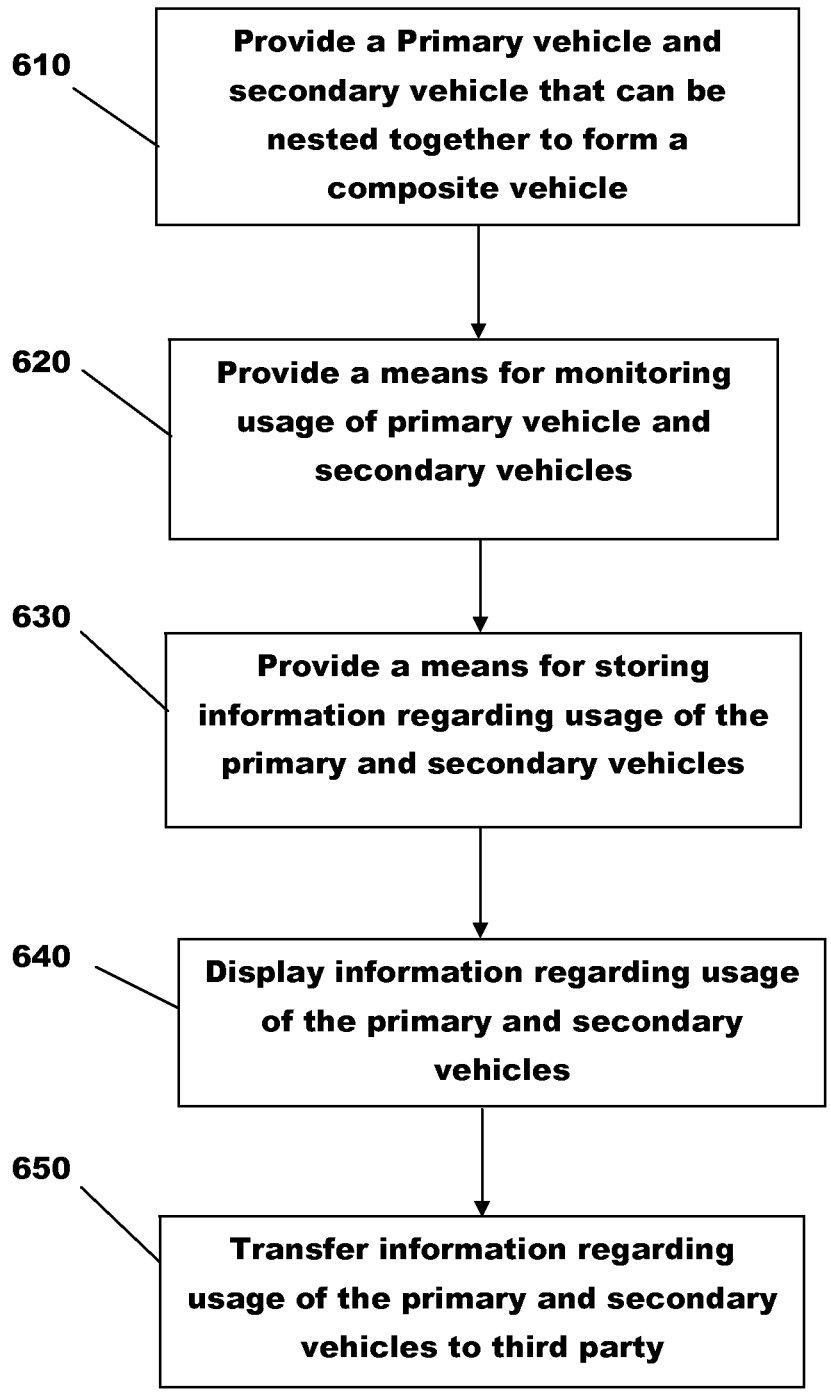
FIG. 8 is a flow chart of a method for reducing passenger vehicle generated Carbon dioxide emissions according to an alternate embodiment.

FIG. 1 shows a first embodiment of a composite vehicle with a primary and a secondary vehicle attached to the exterior of the primary vehicle for transportation. FIG. 2 shows an alternate embodiment where the secondary vehicle is transported inside the primary vehicle in a storage area. FIG. 3 shows an embodiment wherein the secondary vehicle includes an independent battery and electric motor for propulsion that may interact with, but is detachable from, the primary vehicle. FIG. 4 shows the cross section depicted in FIG. 3 of the primary and secondary vehicle. FIG. 5 shows the same cross section of the secondary vehicle. FIG. 6 shows an alternate embodiment of a composite vehicle. FIGS. 7 and 8 show example operating methods. Referring firstly to FIG. 1, an example system 5 includes a composite motor vehicle comprised of a primary or host vehicle 6 in the form of a four wheel road vehicle such as a car and a secondary vehicle 7 in the form of a pedal cycle 7.

For the purposes of this disclosure, the term "composite vehicle" refers to a vehicle comprised of two vehicles which form a two part transportation system having differing levels of $CO_2$ production. One of the vehicles is transportable by the other vehicle and its use produces a lower level of $CO_2$ emissions. The term "composite vehicle" does not refer to the material from which either of the vehicles is made.

It should also be appreciated that the "composite vehicle" may comprise of two vehicles that are designed and manufactured for use as a composite vehicle or may comprise of two vehicles independently designed and manufactured that may be combined by the use of suitable additional components such as hardware, software, and firmware to form a composite vehicle. One example of this would be a conventional or hybrid car and a pedal cycle that may be carried by the car by a rack and to which additional components may be fitted to produce the functionality of a composite vehicle. It should also be appreciated that there may be more than one secondary vehicle transported by the primary vehicle.

The secondary vehicle 7 may be transported by the primary vehicle 6 when it is not in use. In this embodiment, it is carried on a rack mounted on the rear of the primary vehicle 6. The rack may have two brackets 13 to mount or nest the secondary vehicle 7 on the primary vehicle 6. The secondary vehicle 7 has front and rear road wheels 16F and 16R, respectively, and pedals (not shown) which may be actuated by a user for secondary vehicle propulsion.

The primary vehicle 6 has front and rear road wheels 8F, 8R which may be driven by a $CO_2$ generating engine 10 via a transmission (not shown). The engine 10 may be any form of engine that produces CO2 emissions, in this embodiment the engine 10 is a spark ignited petrol engine.

The primary vehicle 6 may include an electronic unit 20 which, as shown, comprises a single unit but could alternately comprise of several units linked together to provide the disclosed functions. An electronic unit 20 may therefore comprise a safety and security unit, one or more memory units to store operational data, one or more microprocessors and one or more units to provide information for display to a user of the primary vehicle 6.

A control system 52 may be included in the electronic until 20 or be independent and communicatively coupled to the electronic until 20. Further embodiments may include multiple control systems, some of which may be located within the electric until 20. The control system 52 may be responsive to sensors 50 that may communicate with the control system via electronic unit 20. The control system 52 may also control actuators 54 or displays via the electronic unit 20. Control system 52 may therefore comprise a safety and security unit, one or more memory units to store operational data, one or more microprocessors and one or more units to provide information for display to a user of the primary vehicle 6 additionally or alternatively to those within electric unit 20.

Electronic unit 20 may be responsive to sensors that communicate via the control system 52 and may control actuators or displays via control system 52. Other embodiments may have a control system that does not communicate with the electronic unit. Specifically, post-manufacturing modifications may equip the vehicle with the functionality described herein. These embodiments may have a primary vehicle control system and/or a secondary vehicle control system that do not communicate with the electronic unit 20.

In the example shown, the electronic unit 20 is operatively connected to other components of the system 5 in the form of a distance sensor 11 used to measure the distance travelled by the primary vehicle 6, a user interface 12, a user controlled override device 19, a connector 15 and, a secondary electronic unit 21 mounted on the secondary vehicle 7 that may communicate with the primary electronic unit 20 via the connector 15.

It should be appreciated that the primary vehicle 6 may, alternatively or additionally to the distance measuring sensor 11, have an energy usage sensor to calculate real CO2 emissions per km travelled. It may also include a CO2 emission sensor to measure the instantaneous and cumulative CO2 emissions from the primary vehicle 6, the secondary vehicle 7, or both.

A distance sensor 22, used to measure the distance travelled by the secondary vehicle 7, may be operatively connected to the secondary electronic unit 21. The secondary electronic unit 21 may supply information to the primary electronic unit 20 regarding usage of the secondary vehicle 7 and, in particular, the distance travelled by the secondary vehicle 7. The secondary electronic unit 21 may also provide an identity signal to the primary electronic unit 20 that may be used by the electronic unit 21 to determine whether the secondary vehicle 7 is nested with the primary vehicle 6 or has been removed.

When the secondary vehicle 7 is removed from the primary vehicle 6, the connection between the secondary vehicle 7 and the electronic unit 20 via the connector 15 may be broken. This may be used as an indication that the secondary vehicle 7 has been removed from the primary vehicle 6.

The braking or disconnection of the connector 15 can be sensed in a number of ways. A proximity sensor may be used that senses whether the two parts of the connector 15 are connected. The absence of a signal reception of the primary electronic 20 from the secondary electronic unit 21 may also be used by the electronic unit 20 as an indication that the secondary vehicle 7 has been removed.

The removal of the secondary vehicle 7 may also be sensed independently of the state of the connector 15. For example, a contactless communication link between the primary and secondary vehicles 6 and 7 may be used to determine when the secondary vehicle 7 is located remotely from the primary vehicle 6. Specifically, in some embodiments, an infrared or radio frequency signal of low power may be transmitted by the secondary vehicle 7. If the signal is not receivable by the primary vehicle 6 it may be assumed that the secondary vehicle 7 has been removed.

Alternatively, an electronic system may be provided to track the geographic positions of the primary and secondary vehicles 6 and 7, compare the locations of the primary and secondary vehicles 6 and 7, and provide output indicative of the removal of the secondary vehicle 7 if the respective geographic locations of the primary and secondary vehicles 6 and 7 differ by more than a predefined amount.

In one disclosed embodiment, the primary vehicle 6 may be immobilized when the secondary vehicle 7 is removed so as to prevent parallel or dual usage of the two vehicles 6, 7. To this end, an immobilizing device comprising an electronic controller operable to prevent operation of the engine 10 if the secondary vehicle 7 is removed from the primary vehicle 6 may be provided as part of the system 5. The electronic controller may be formed as part of the electronic unit 20 or may be a separate unit and may make use of existing vehicle capabilities.

For example, if immobilizing of the primary vehicle 6 is required, the same apparatus used to immobilize the primary vehicle 6 when it is locked by a user (such as a safety and security) may be used to effect primary vehicle immobilization, thereby reducing any extra costs associated with use of the embodiment.

The system 5 may further include data storage device for storing information regarding usage of the primary and secondary vehicles 6 and 7. In one embodiment, the data storage device may comprise one or more memory devices formed as part of the electronic unit 20.

The stored information may be used to provide information to a user of the composite vehicle regarding usage of the primary and secondary vehicles 6 and 7. Stored information may also be extracted by regulatory authorities from the electronic unit 20 using a diagnostic port (not shown) for uses including taxation. Alternately, the data for a journey may be stored temporarily in the primary vehicle 6 and then be transmitted to regulatory authorities and/or to the manufacturer of the primary vehicle 6 for cumulative vehicle history storage.

For example, if the data stored in the electronic unit 20 indicates that the primary vehicle 6 has travelled 9500 km and the secondary vehicle has travelled 500 km this could be used to adjust the taxation payable so as to encourage greater use of the secondary vehicle 7. This may be advantageous in countries (such as the UK) wherein road excise duty is based upon the grams of CO2 emitted per km and various bands and excise rates are in effect. Embodiments may allow a user to store, discard, or transmit stored information regarding the usage of the primary and secondary vehicle via a user prompt or input device. A user may also be able to selectively store usage information including deactivating the data storage device via a user prompt.

Table 1 below provides an example of how emission bands may relate to the tax levied.

TABLE 1

| B and -> | A | B | C | D | E | F | G |
|---|---|---|---|---|---|---|---|
| CO2 (g/km) | <100 | 101-110 | 111-120 | 121-130 | 131-140 | 141-150 | 151-165 |
| Tax £ | 0 | 20 | 30 | 95 | 115 | 130 | 165 |
| B and -> | H | I | J | K | L | M | |
| CO2 (g/km) | 166-175 | 176-185 | 186-200 | 210-225 | 226-255 | >225 | |
| Tax £ | 190 | 210 | 245 | 260 | 445 | 460 | |

Example 1, assumes a user travels 9500 km in one year using the primary vehicle 6 and 500 km using the secondary vehicle 7. If the quoted CO2 rating for the primary vehicle 6 is, for example, 105 g/km the user may be charged £20 in road tax. But if the total usage of the two vehicles could be taken into account a potential saving of £20 could be offered to the driver: (9500*105)/10000=99.75 g/km via government issued incentives.

Example 2 assumes the primary vehicle 6 is a 180 g/km vehicle and is used for 5500 km and the secondary vehicle 7 is used for 600 km.

In this example the potential tax saving is £45 because the recalculated emissions are: (5500*180)/6000=165 g/km.

For example, if the usage of the secondary vehicle 7 is deducted from the usage of the primary vehicle 6 but the total distance is retained then, using the values from examples 1 and 2 above:

((9500−500)*105)/10000=94.5 g/km    Example 3

((5500−500))*180/10000=90.0 g/km    Example 4

In this example the resulting potential savings are £20 and £210 respectively.

It should be appreciated that these savings are exemplary. Other taxation systems may further enhance savings, for example, by providing increased savings for increased usage of the secondary vehicle.

A vehicle manufacturer may potentially benefit from this reduction either by affecting their fleet-average emissions directly or by receiving credits for employing an eco-innovation technology. Therefore, fleet-average emission targets may be used to incentivize the uptake of composite vehicles with their knock-on benefit of reduced city-centre congestion and pollution levels.

Advantageously, the system 5 includes the user interface 12 for displaying information regarding usage of the primary and secondary vehicles 6 and 7 as part of the primary vehicle 6. This may be displayed via a simple gauge or counter or a display screen on which information regarding usage is displayed.

For example, the user interface 12 may show one or more of the distances travelled by the primary vehicle and secondary vehicles. It may further display an indication of the actual usage of the primary vehicle compared to a target usage to meet a taxation or other use criterion or the compensated usage for the primary vehicle based upon actual usage of the primary and secondary vehicles such as given above in examples 1 to 4. This may give the user of the composite vehicle the opportunity to modify their usage patterns to minimize CO2 emissions and/or maximize tax savings.

Another embodiment may provide the primary vehicle 6 a navigation system (not shown) capable of determining a current position of the primary motor vehicle 6 and a destination for the primary vehicle 6 based upon a user input. In this example, a user prompt (not shown) may also be provided to analyze positional information from the navigation system and provide an 'output' to a user of the primary vehicle 6 via a display which may be the user interface 12 or a separate display such as the display screen of the navigation system. It should be appreciated that the user prompt may include an electronic processor formed as part of the electronic unit 20 or as part of the navigation system to generate the 'output'.

The information displayed may be used to indicate to a user of the primary vehicle 6 when an 'opportunity for use' of the secondary vehicle 7 exists based upon information regarding the destination of the primary vehicle, the proximity of the primary vehicle 6 to its destination and the location of parking garages in the vicinity of the destination. This 'opportunity for use' could also include providing a cost trade-off calculation for the whole journey, including fuel usage, parking alternatives, congestion charging etc., overlaid with corresponding travel times, to give the driver optimum scenarios such as, cheapest journey, quickest journey, greenest journey, etc.

For example, if the destination for the primary vehicle 6 is located within a city, the user prompt may calculate a 'use distance' from the destination for which it would be reasonable to use the secondary vehicle 7 or for which it may make sense to use the secondary vehicle 7 due to congestion and then seek out parking garages within the area defined by the destination and the 'use distance' that may be used to park the primary vehicle 6. When the area bounded by the 'use distance' is sensed from the navigation system to be reached the user prompt may issue an advice message via the display such as:

"Use of Secondary vehicle is advised.

Do you wish to use Secondary Vehicle?".

If the answer is 'yes' then the user prompt may automatically select the nearest parking garage and reset the destination of the navigation system to that parking garage. If the driver decides not to swap to the secondary vehicle 7 thereby ignoring the user prompt, then additional reminders and further warnings may be issued to encourage use of the secondary vehicle 7.

In some embodiments, the system 5 may include an override device 19 which can be operated by the user of the primary vehicle 6 in order to override the immobilization of the primary vehicle 6 when the secondary vehicle 7 is removed. This may allow for dual use of the vehicles in circumstances where, for example, the primary vehicle 6 is in for repair or service or for use of both vehicles 6, 7.

Although the primary vehicle 6 is shown and described in respect of a conventional motor vehicle powered by an engine 10, it should be appreciated that the primary vehicle could be a hybrid vehicle having an engine and one or more electric motors and associated batteries for use in powering the primary vehicle 6.

Although the embodiments so far described immobilize the primary when the secondary vehicle is removed, it should be appreciated that other embodiments may not immobilize the vehicle.

Referring now to FIG. 2, an alternate embodiment of a system 105 includes a composite vehicle comprised of primary and secondary vehicles 106 and 107 that may be similar to that previously described with respect to FIG. 1 in many respects.

As before, the secondary vehicle 107 may be transported by the primary vehicle 106 when it is not in use and in this example may be transported in a load or luggage area of the primary vehicle 106.

The secondary vehicle 107 has front and rear road wheels 116F and 116R respectively and a combined battery and motor unit 125 that may propel a secondary vehicle when in use. It should be appreciated that the battery and the electric motor needn't be formed as a single combined battery and motor unit and may be separate components.

In the example shown, the combined battery and motor unit 125 is drivingly connected to the rear wheel 116R by an output shaft. Embodiments may also use other drive connections such as a belt drive or a chain drive. In this embodiment, the secondary vehicle 107 is an electric bicycle, in other embodiments it may be an electric scooter or other small electric powered vehicle that can be conveniently stowed in the load area of the primary vehicle 106.

An electric generator in the form of an alternator 109 driven by the engine 110 may be used to provide electrical power to the primary vehicle 106 and may also supply electrical power to the secondary vehicle 107 to recharge the battery of the combined battery and motor unit 125. Electric power may be supplied to the secondary vehicle 107 via the connector 115. The battery of the secondary vehicle 107 may be charged by the generator when the primary vehicle 106 is slowing down by way of regenerative braking. The use of regenerative braking may thus recuperate kinetic energy from the primary vehicle 106 that may otherwise be lost.

The primary vehicle 106 has front and rear road wheels 108F, 108R and, in this embodiment, the two front road wheels 108F are driven by a $CO_2$ generating engine 110 via a transmission (not shown). The engine 110 may be any form of engine that produces $CO_2$ emissions such as a diesel or petrol engine.

The system 105 includes an electronic unit 120 as part of the primary vehicle 106. Electronic unit 120 may comprise a single unit or several units linked together to provide the required functions. As before, the electronic unit 120 can therefore comprise an engine control unit, a safety and security unit, one or more memory units to store operational data, one or more microprocessors, and/or one or more units to provide information for display to a user of the primary vehicle 106.

The electronic unit 120 may be operatively connected to other components of the system 105 in the form of a distance sensor 111 used to measure the distance travelled by the primary vehicle 106, a user interface 112, a user controlled override device 119, a connector 115, and/or a secondary electronic unit 121 mounted on the secondary vehicle 107.

The primary vehicle 106 may, in alternative or addition to the distance measuring sensor 111, have an energy usage sensor to calculate real $CO_2$ emissions per km travelled and/or a $CO_2$ emission sensor to measure the instantaneous and cumulative $CO_2$ emissions from the primary vehicle 106 or from the primary vehicle 106 and the secondary vehicle 107. A distance sensor 122, may be used to measure the distance travelled by the secondary vehicle 107, and may be operatively connected to the secondary electronic unit 121.

The secondary electronic unit 121 may supply information to the primary electronic unit 120 regarding usage of the secondary vehicle 107, specifically the distance travelled by the secondary vehicle 107. The secondary electronic unit 121 may also provide an identity signal to the primary electronic unit 120 that can be used by the electronic unit 10 to determine whether the secondary vehicle 107 is nested with the primary vehicle 106 or has been removed. When the secondary vehicle 107 is removed from the primary vehicle 106, the connection between the secondary vehicle 107 and the electronic unit 120 via the connector 115 may be broken and used as an indication that the secondary vehicle 107 has been removed from the primary vehicle 106.

As before, the removal of the secondary vehicle 107 may be sensed independently of the state of the connector 115 by a contactless communication link between the primary and secondary vehicles 106 and 107. Alternately, an electronic system may be provided to track the geographic positions of the primary and secondary vehicles 106 and 107, compare the locations of the primary and secondary vehicles 106 and 107 and provide an output indicative of the removal of the secondary vehicle 107 if the respective geographic locations of the primary and secondary vehicles 106 and 107 differ by more than a predefined amount.

The primary vehicle 106 may be immobilized when the secondary vehicle 107 is removed so as to prevent parallel or dual usage of the two vehicles 106 and 107. The primary vehicle 106 may therefore be fitted with an immobilizing device comprising an electronic controller operable to prevent operation of the engine 110 if the secondary vehicle 107 is removed from the primary vehicle 106. The electronic controller may be formed as part of the electronic unit 120 or may be a separate unit and may make use of existing vehicle capabilities.

The system 105 also includes data storage device for storing information regarding usage of the primary and secondary vehicles 106 and 107. This stored information may be used to provide information to a user of the composite vehicle regarding usage. It may further be extracted by regulatory authorities from the electronic unit 120 using a diagnostic port (not shown), for example, for other uses including taxation.

The user interface 112 may display information regarding usage of the primary and secondary vehicles 106 and 107 and can take the form of a simple gauge or counter in the primary vehicle 106 showing usage, a display screen, or a touch screen display on which information regarding usage is displayed. Further, the user interface may allow specific usage targets that may be set via operator input.

The information displayed may include one or more of the distances travelled by the primary and secondary vehicles 106, 107 and an indication of the actual usage of the primary vehicle 106 compared to a target. By displaying usage information, a user of the composite vehicle may be encouraged to modify their usage pattern to minimize $CO_2$ production, reduce congestion, and/or benefit from tax savings.

The primary vehicle 106 may also have a navigation system (not shown) capable of determining a current position of the primary vehicle 106 and a destination for the primary vehicle 106 based on a user input. A user prompt device (not shown) may be provided to analyze positional information from the navigation system and provide an 'output' to a user of the primary vehicle 106 via a display. The display may be the user interface 112 or a separate display such as a display screen of the navigation system.

In either case, the display may be used indicate to a user of the primary vehicle 106 when an 'opportunity for use' of the secondary vehicle 107 exists based upon information regarding the destination of the primary vehicle, the proximity of the primary vehicle 106 to its destination and the location of parking garages in the vicinity of the destination to encourage use of the secondary vehicle 107. The user prompt device may include an electronic processor formed as part of the electronic unit 120 or as part of the navigation system to generate the 'output'.

As before, this 'opportunity for use' may also include providing a cost trade-off calculation for the whole journey, including fuel usage, parking alternatives, congestion charging etc., overlaid with corresponding travel times, to give the driver optimum scenarios such as, cheapest journey, quickest journey, greenest journey, etc.

FIGS. 3 through 5 show an additional embodiment of a system 205 including a composite vehicle comprised of a primary vehicle 206 and a secondary vehicle wherein a combined battery and motor unit 217 is shown in FIGS. 3 and 4 and a rear wheel 240 is shown attached to the combined battery and motor unit 217 in FIG. 5. The secondary vehicle may also include a frame (not shown) and a front wheel (not shown). All of the parts forming the secondary vehicle may be, when not in use, transported by the primary vehicle 206 in a load or luggage area of the primary vehicle 206.

The combined battery and motor unit 217 includes a battery 225, an electric motor 226 and a secondary electronic unit 221. A sensor (not shown) may also be provided to measure the distance travelled by the secondary vehicle when it is in use. Two brackets 229 connect the combined battery and motor unit 217 to the frame or another structure so as to form an electric cycle when it is removed from the primary vehicle 206.

The electric motor 226 is drivingly connectable to the rear wheel 240 by an output shaft 218 that engages with a splined hub 241 of the rear wheel 240 and may be selectively securable in position by a releasable locking device (not shown).

Although, in this case, the secondary vehicle is an electric bicycle, it should be appreciated that it could be another type of small electric powered vehicle that can be conveniently stowed in the load area of the primary vehicle 206.

In this embodiment, the electric motor 226 may be used to recharge the battery 225 as will be described in further detail. Alternatively, an electric generator such as an alternator may be driven by the engine 210 as shown by the dotted outline 209 either to assist with or fully provide charging of the battery 225.

The primary vehicle 206 may have front and rear road wheels 208F, 208R driven by a CO2 generating engine 210 via a transmission (not shown) and the rear wheels 208R may be drivable by the electric motor 226 when the combined battery and motor unit 217 is stowed in the primary vehicle 206. A differential unit 230 having two output shafts 231A and 231B may be provided with an input with which the output shaft 218 of the electric motor 226 is engaged when the combined battery and motor unit 217 is stowed in the primary vehicle 206. Power from the electric motor 226 may be transmitted via the differential unit 230 and the two output shafts to the rear wheels 208R.

The primary vehicle 206 may be a hybrid vehicle powered by the engine 210, motor 226, or by both. Although in this case one battery 225 is available to power the electric motor 226, a further battery may be located on the primary vehicle 206.

The engine 210 of the primary vehicle 206 may be any form of engine that produces CO2 emissions.

In this embodiment, the system 205 and the primary vehicle 206 includes an electronic unit 220 that may comprise a single unit or several units linked together to provide the required functions. The electronic unit 220 may therefore comprise an engine control unit, a safety and security unit, one or more memory units to store operational data, one or more microprocessors, and one or more units to provide information for display to a user of the primary vehicle 206. The electronic unit 220 may be operatively connected to other components of the system 205 including a distance sensor 211 used to measure the distance travelled by the primary vehicle 206, a user interface 212, a user controlled override device 219, a connector 215, and a secondary electronic unit 221 mounted on the combined battery and motor unit 217.

It should be appreciated that the primary vehicle 206 may, as an alternative or addition to the distance measuring sensor 211, have an energy usage sensor to calculate real CO2 emissions per km travelled and/or a CO2 emission sensor to measure the instantaneous and cumulative CO2 emissions from the primary vehicle 206 or from the primary vehicle 206 and the secondary vehicle 207.

The motor 226 may be used as a generator to provide electric power to the battery 225 via the differential unit 230. The motor may be driven by the slowing of rear wheels 208R of primary vehicle 206, in a process called regenerative breaking. The use of regenerative braking recuperates kinetic energy from the primary vehicle 206 that may otherwise be lost. It should be appreciated that the embodiments are not limited to the use of regenerative braking to recharge the battery 225.

The secondary electronic unit 221 may supply information to the primary electronic unit 220 regarding usage of the secondary vehicle 217 and, in particular, the distance travelled by the secondary vehicle. The secondary electronic unit 221 may also provide an identity signal to the primary electronic unit 220 that may be used by the electronic unit 220 to determine whether the combined battery and motor unit 217 of the secondary vehicle is nested with the primary vehicle 206 or has been removed.

When the combined battery and motor unit 217 is removed from the primary vehicle 206, the connection between the secondary electronic unit 221 and the electronic unit 220 via the connector 115 may be broken and this may be used as an indication that the parts forming the secondary vehicle have been removed from the primary vehicle 206.

Alternatively, the removal of the secondary vehicle or, in this example, the combined battery and motor unit 217, may be sensed independently of the state of the connector 215 in a previously described method.

A navigation system and the user prompt of the primary vehicle 206 may be removable from the primary vehicle 206 for use on the secondary vehicle 207 to enable the secondary vehicle 207 to continue the journey to the destination and to guide the secondary vehicle 207 back to the primary vehicle 206.

Alternatively, destination information may be transferred either by physical connection or wirelessly to the secondary vehicle 207 from the primary vehicle 206 to enable the secondary vehicle 206 to continue the journey to the destination and to guide the secondary vehicle 207 back to the primary vehicle 206. In this example, the secondary vehicle may be provided with some form of route guidance unit.

In the embodiments described above, the data storage device, the user interface device, and the user prompt device are formed as part of the primary vehicle. However, in other embodiments, the data storage device(s) for storing information regarding usage of the primary and secondary vehicles, the user interface device for displaying information regarding usage of the primary and secondary vehicles, and/or the user prompt device for providing information regarding potential opportunities for use of the secondary vehicle could be formed by a transportable communications device such as a smartphone, tablet, or other portable electronic device.

The transportable communication device may include a microcomputer, including a microprocessor unit, input/output ports, an electronic storage medium (e.g., a read-only memory chip) for non-transitory executable programs and calibration values, random access memory, keep alive memory, and a data bus. The transportable communication device may be programmed with computer readable data representing instructions executable by a processor of the transportable communication device for performing the methods described herein as well as other variants that are anticipated but not specifically listed. These may include instructions for receiving global positioning signals, CO2 emissions, user input, and information from external data sources.

FIG. 6 shows another embodiment of a system 305 comprising a primary vehicle 306 and a secondary vehicle 307. The primary vehicle 306 has a CO2 producing engine 310 and road wheels 308F, 308R. The secondary vehicle has two road wheels 316F, 316R. However, in this embodiment, instead of using immobilizer and override devices to control the usage of the primary vehicle 306, the primary vehicle 306 includes a vehicle movement data recorder 323 to validate the usage of the primary vehicle 306 by recording time stamps of odometer changes or of ignition on/off events. The primary vehicle 306 may further include a Near Field Communication tag (NFC tag) and/or a Radio Frequency Identification tag (RFID tag) indicated generally by the reference numeral 324. The secondary vehicle 307 may include either a NFC tag or a RFID tag indicated by the reference numeral 325.

The primary vehicle 306 and secondary vehicle 307 may be connected wirelessly via the NFC or RFID tags 324 and 325, to a transportable communications device 326 such as a smartphone, tablet computer or personal computer such as a netbook or laptop. A radio frequency reader 327 may be integrated into the transportable communications device 326. Alternatively and as is shown, a radio frequency reader 327 may be operatively connected to the transportable communications device 326 by a cable or wire.

The transportable communications device 326 may be loaded with and run an application that may, in some instances, be released or endorsed by a regulatory or taxation agency.

A disclosed application may be executed via a processing unit and may receive geographic data from an external source. When the application is running a user may be prompted to input a destination into the application. Further, the current location may be known by the transportable communications device 326. The application may then be operable to query or retrieve data on congestion, parking at destination, road usage charges, restrictions etc. The processing unit may have instructions to overlay this information with historic running cost/emission data for the composite vehicle to output a selection of travel options (quickest, cheapest, greenest) making optimal use of one or both of the vehicles 306 and 307 forming the composite vehicle. This output may be received by the driver via a display.

Based upon the provided information, a user may select a chosen route via an input device. The user may then take the transportable communications device 326 along in the chosen vehicle 306 or 307 for navigation and control of the composite vehicle system.

During use, the application may continuously monitor the availability of the NFC or RFID tags 324 and 325 of both vehicles 306 and 307 and record connection to both. It may also record and synchronize the time stamps of the vehicle movement data recorder 323 fitted to the primary vehicle 306 with the application, if in range.

If the NFC or RFID tags of both the primary and secondary vehicles 306 and 307 may be connected to the application while the position of the transportable communications device 326 is changing. It may subsequently be determined if the primary vehicle 306 is driving and transporting the secondary vehicle 307 enabling a sequential journey. Here, a sequential journey is one in which one vehicle is used at a time.

If the NFC or RFID tag 324 located on the primary vehicle 306 is connected and the NFC or RFID tag of the secondary vehicle 325 is not, the primary vehicle 306 may be driving without the secondary vehicle 307 and no sequential journey may occur.

If the NFC tag or RFID tag 325 located on the secondary vehicle 307 is connected and the NFC tag or RFID tag 324 located on the primary vehicle 307 is not, a sequential journey may be possible, if the primary vehicle 306 is not driving independently. This can be confirmed via the time stamps stored in the vehicle movement data recorder 323 on the primary vehicle 306 at the next reconnection of the application running on the transportable communications device 326 with the primary vehicle 306.

The application may continuously record the position of the transportable communications device 326 during the journey, and together with the time stamps of connection to the NFC or RFID tags 324 and 325, calculate the usage of both vehicles 306 and 307. It may further determine if a sequential journey occurred and, if available, whether tax breaks or other incentives have been earned.

Continuously, at regular intervals, or after each journey, the application may transmit the calculated journey distances and calculated CO2 savings with an identification (ID) of the primary vehicle 306 to regulatory and/or taxation authorities for data storage/action. Potentially, the vehicle ID and time stamps when entering/exiting certain charging zones could also be transmitted to regulatory and/or taxation authorities to pay other charges or receive other incentives, depending on which vehicle was used.

Using this simplified approach, the investment by a user may be limited to the vehicle movement data recorder 323 for recording time stamps, the NFC tags/RFIDs 324 and 325 and NFC/RFID reader 327 for transmitting and receiving the time stamp data and for proximity sensing along with the application and a suitable transportable communications device 326.

Referring now back to systems 5, 105 and 205 shown in FIGS. 1, 2 and 3 may also include a transportable communication device. Therefore, the data storage device for storing information regarding usage of the primary and secondary vehicles, the user interface device for displaying information regarding usage of the primary and secondary vehicles, and/or the user prompt device for providing information regarding potential opportunities for use of the secondary vehicle, may be included within a transportable communications device.

A method of operating a composite motor vehicle such as that shown in FIG. 1 is shown in FIG. 7.

The method commences at 501 with an ignition key-on event for the primary vehicle and then advances to block 502 to determine whether the primary and secondary vehicles are nested together. In other embodiments, it may be determined if the secondary vehicle or a combined battery and motor unit has been removed or detached from the primary vehicle.

If the primary and secondary vehicles 6 and 7 are nested together then the method may advance to 510 and normal operation of the primary vehicle 6 may be enabled. The distance and/or energy consumed and/or CO2 emitted data may be synchronized between the data storage systems of the primary and the secondary vehicles. At 530 it may be determined whether the ignition key is still in the on position. If the ignition key is still in an on position the method may return to 502, if it is not the method may end at 550.

Referring back to 502, if the primary and secondary vehicles are not nested together the method may advance to 520. If an override is not available, as may be the case in other embodiments, the method may advance straight to 525.

At 520 it may be determined whether there is a manual override and, if there is, the method may advance to 510 and thereafter to 530 as discussed above. However, if there is no manual override at 520, the method may advance to 525 and the primary vehicle may be immobilized. From 525 the method may advance to 530 to determine whether the ignition key is still in the on position. If the key is in the on position the method may return to 502, if it is not the method may end at 550.

A method for reducing passenger vehicle generated CO2 emissions is shown in FIG. 8.

The method starts at 610 where the method comprises providing a composite passenger vehicle having a primary vehicle that produces CO2 emissions and a secondary vehicle that produces substantially less CO2 emissions and is transportable by the primary vehicle. The method then advances to the steps 620, 630, 640 and 650 described below.

At 620, a device for monitoring usage of the primary and secondary vehicles is provided. This could be via electronic units attached to the primary vehicle and secondary vehicles as described with reference to FIGS. 1 to 5. It may also be a Radio Frequency or Near Field device, a vehicle movement data recorder, and/or a transportable personal communications device loaded with a software application as described with reference to FIG. 6.

At 630, information regarding usage of the primary and secondary vehicles may be saved or stored for later retrieval in a memory device forming part of the primary vehicle as described with reference to FIGS. 1 to 5 or in a memory device formed as part of the transportable communications device or as part of the movement data recorder. This provides the opportunity for use by regulatory authorities and/or by the user to evaluate use of the composite vehicle.

At 640, information regarding the usage of the primary and secondary vehicles may be displayed to assist the user with usage of the composite vehicle. This may be via a display formed as part of the primary vehicle (such as in the case of the embodiments shown in FIGS. 1 to 5) or by a transportable communication device (such as in the case of the embodiment shown in FIG. 6).

Further, at 650, information regarding usage may be transmitted or transferred to regulatory authorities or other third parties requiring such information. This may be achieved wirelessly or by a physical link such as a cable.

An example of the method relating to the embodiment shown in FIG. 6, may include providing a primary and secondary vehicle a data recorder to produce time stamps of significant events such as distance travelled and key-on events, attaching radio frequency tags to the primary and secondary vehicles, providing a radio frequency tag reader to read the radio frequency tags, providing a personal transportable communications device enabled with a software application, linking the radio frequency tag reader to the transportable communications device, and/or using the transportable communications device to calculate and store usage data for both vehicles and using the transportable communications device to transfer the usage data to a third party such as a regulatory authority.

The secondary vehicle has been described with reference to a two wheeled vehicle such as a pedal cycle, electric cycle or electric scooter because such devices are particularly advantageous in reducing congestion due to their compact shape. However, the systems and methods herein may be applied to other types of secondary vehicles. For example a subsidiary or secondary vehicle may be in the form of a small car. It should be appreciated that the disclosed systems and methods may be applied to any arrangement wherein the subsidiary vehicle is electric powered or produces significantly less CO2 emissions than the primary vehicle.

Further, the primary vehicle may be a large commercial vehicle and the secondary vehicle may be a smaller delivery vehicle that may be demountable from the large commercial vehicle to make local deliveries. In such a case the use of the secondary vehicle may not produce substantially zero CO2 emissions but the CO2 emissions would be considerably less than the large commercial vehicle.

Yet another example may have a motorhome producing large CO2 emissions as the primary vehicle that may tow small city vehicle producing low or substantially less CO2 emissions.

Therefore, a primary vehicle such as a car or van and a secondary vehicle that together form a composite vehicle, may increase vehicle efficiency, potentially enter urban centers without restrictions/charges, reduce CO2 taxes, and reduce company fleet emission averages.

The systems and methods disclosed herein may also apply to goods-carrying vehicles, where one or more secondary vehicles may be nested in or with the primary vehicle to distribute goods. The term 'nested' as used herein means that the primary and secondary vehicles are connected together in a manner permitting the transportations of the secondary vehicle by the primary vehicle. This may include carrying of the secondary vehicle by the primary vehicle and towing of the secondary vehicle by the primary vehicle.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   transporting a secondary vehicle using a carbon dioxide emission producing primary vehicle that produces more carbon dioxide emissions than the secondary vehicle;
   operating the primary vehicle while the secondary vehicle is nested with the primary vehicle; and
   immobilizing the primary vehicle by preventing the operation of an engine of the primary vehicle if the secondary vehicle is removed from the primary vehicle.

2. The method of claim 1, further comprising monitoring usage, storing information, and displaying information regarding usage of the primary vehicle; monitoring usage, storing information, and displaying information regarding usage of the secondary vehicle; determining a current position of the primary vehicle; and displaying information regarding potential opportunities for use of the secondary vehicle based on the position of the primary vehicle.

3. The method of claim 1 wherein the primary vehicle has four wheels and the secondary vehicle has two additional wheels.

4. The method of claim 2 wherein the displayed information is a distance travelled by the primary vehicle and a distance travelled by the secondary vehicle, an indication of actual usage of the primary vehicle compared to a target usage, a compensated usage for the primary vehicle based upon the actual usage of the primary vehicle and the secondary vehicle, or some combination thereof.

5. The method of claim 1, further comprising detecting whether the secondary vehicle has been removed from the primary vehicle with a physical sensor or a contactless communication link between the primary vehicle and the secondary vehicle operable to determine when the secondary vehicle is located remotely from the primary vehicle.

6. The method of claim 5, wherein the contactless communications link uses Radio Frequency Identification or Near Field Communication and includes an active radio frequency or a passive radio frequency tag on each vehicle and a radio frequency reader to read output from the radio frequency tags.

7. The method of claim 2, further comprising tracking a geographic position of the primary vehicle and the secondary vehicle, comparing locations of the primary vehicle and the secondary vehicle, and providing an output indicative of a removal of the secondary vehicle if respective geographic locations of the primary vehicle and the secondary vehicle differ by more than a predefined amount.

8. The method of claim 2, further comprising determining a current position of the primary vehicle and a destination for the primary vehicle based upon a user input and indicating when an opportunity for use of the secondary vehicle exists responsive to the destination of the primary vehicle, a proximity of the primary vehicle to its destination, and locations of parking garages in a vicinity of the destination.

9. The method of claim 1, wherein operating the secondary vehicle produces zero CO2 emissions.

10. The method of claim 1, wherein the secondary vehicle is a bicycle, scooter, moped, motorcycle, or hybrid vehicle, or another vehicle propelled in some part by a combustion engine.

11. The method of claim 1, wherein the primary vehicle is a commercial vehicle, car, van, truck, or a hybrid version thereof.

12. The method of claim 2, wherein a smartphone, tablet, laptop computer, or other hand held electronic device monitors usage, stores information, and displays information regarding usage of the primary vehicle and the secondary vehicle and displays information regarding potential opportunities for use of the secondary vehicle.

13. The method of claim 1, wherein the primary and secondary vehicles share a battery located within the secondary vehicle such that the battery propels the secondary vehicle when the secondary vehicle is in use.

14. The method of claim 13, wherein the primary vehicle has an alternator that provides electrical power to the primary vehicle and to the secondary vehicle to charge the battery.

15. The method of claim 1, wherein the primary vehicle has a CO2 emission sensor and one or more of a distance measuring sensor, and a energy usage sensor.

16. The method of claim 1, wherein the primary vehicle has a combustion engine.

17. The method of claim 1, wherein the primary vehicle is immobilized by an electronic controller operable to prevent operation of the engine.

18. The method of claim 1, wherein the primary vehicle has a navigation system removable from the primary vehicle for use in the secondary vehicle.

19. The method of claim 1, further comprising storing data regarding usage of the primary and secondary vehicles, the data comprising carbon dioxide produced by use of the primary and secondary vehicles and one or more of distances travelled by the primary and secondary vehicles, time stamps of movement of the primary and secondary vehicles, time stamps of engine-on events of the primary and secondary vehicles, and energy consumed by the primary and secondary vehicles.

20. The method of claim 19, further comprising transferring the stored data regarding usage of the primary and secondary vehicles to a third party.

* * * * *